Feb. 17, 1959    M. A. THORNE    2,873,953
AIR HEATING AND COOLING APPARATUS FOR VEHICLES
Filed Dec. 31, 1954    5 Sheets-Sheet 1

INVENTOR
Maurice A. Thorne
BY
C. J. Libbe
ATTORNEY

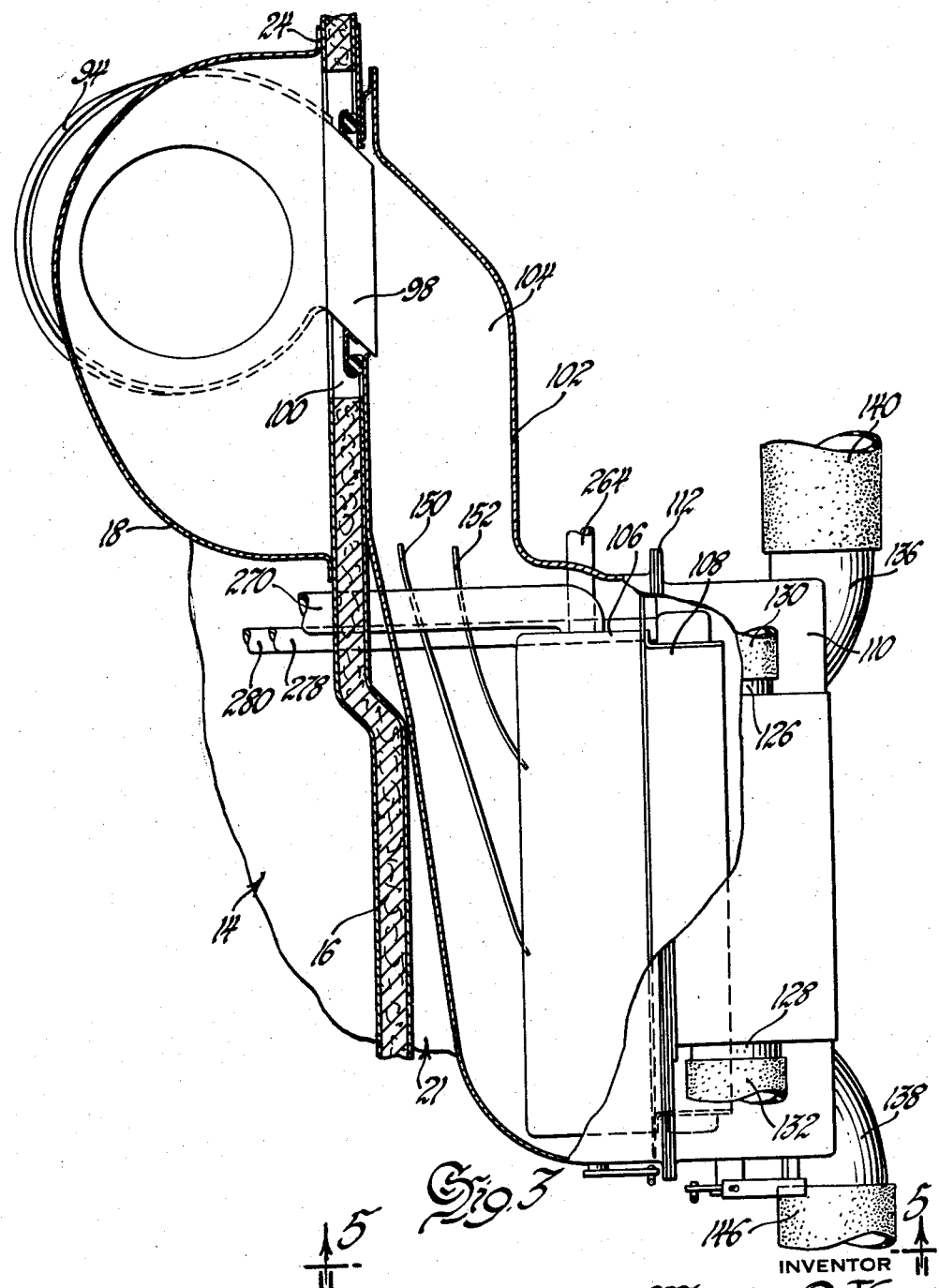

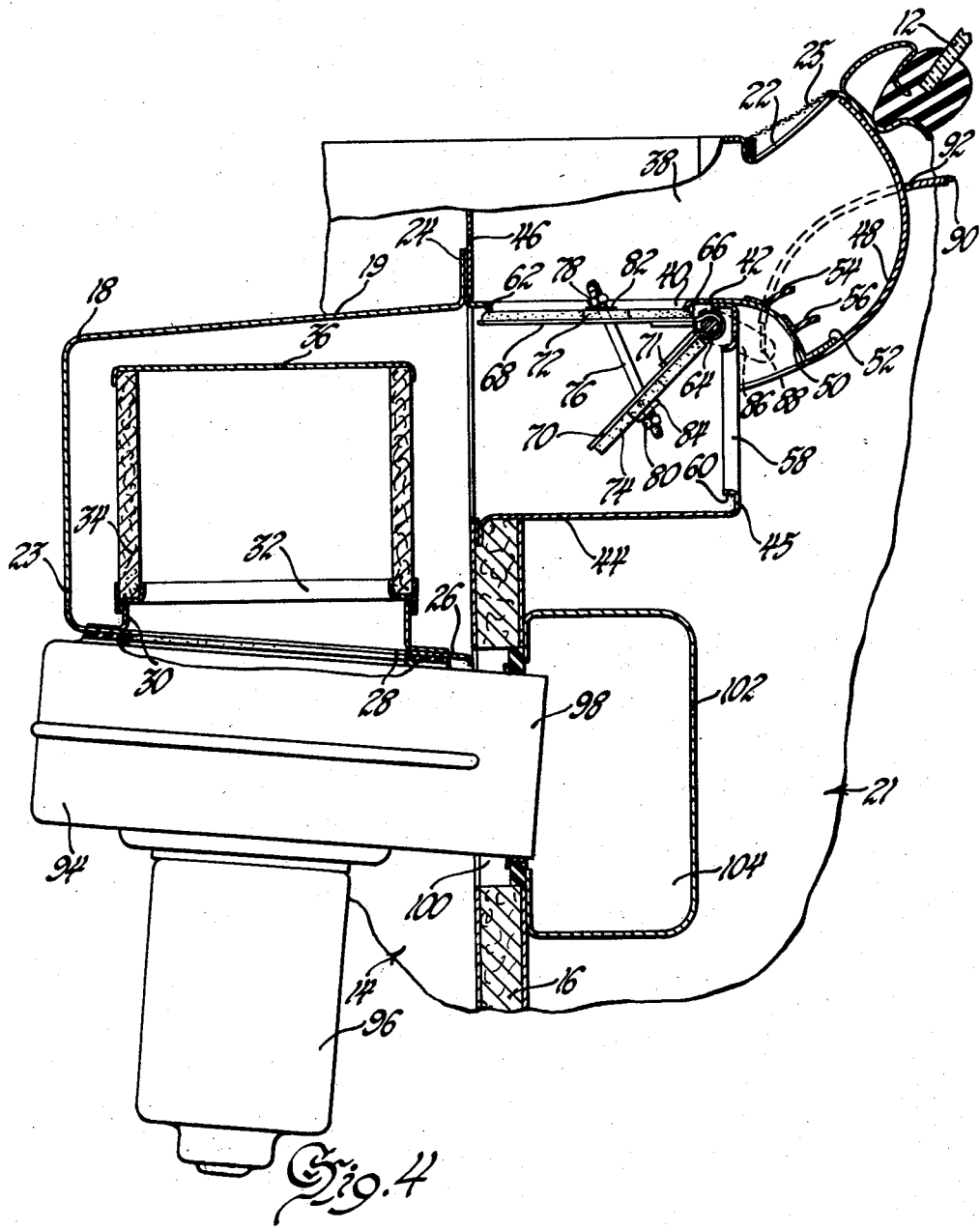

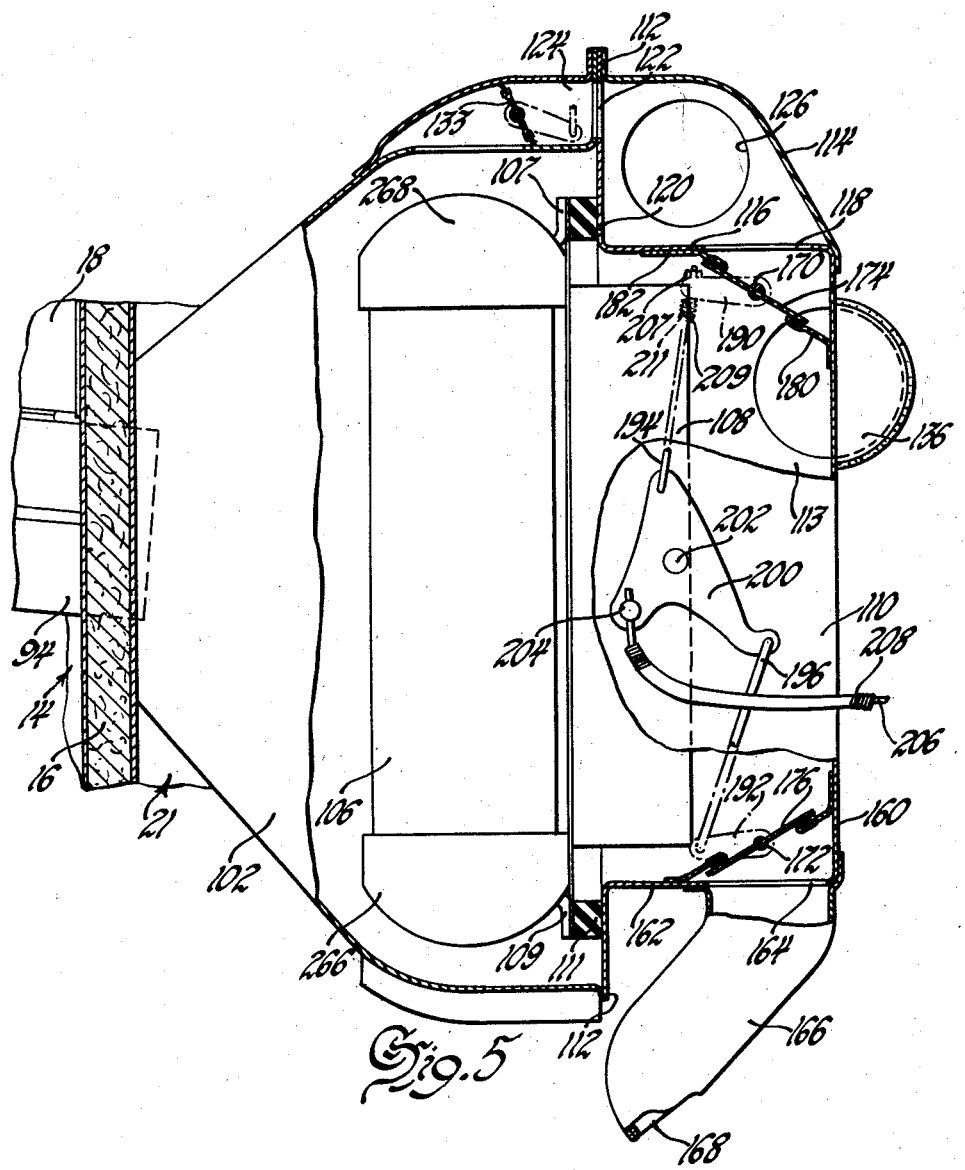

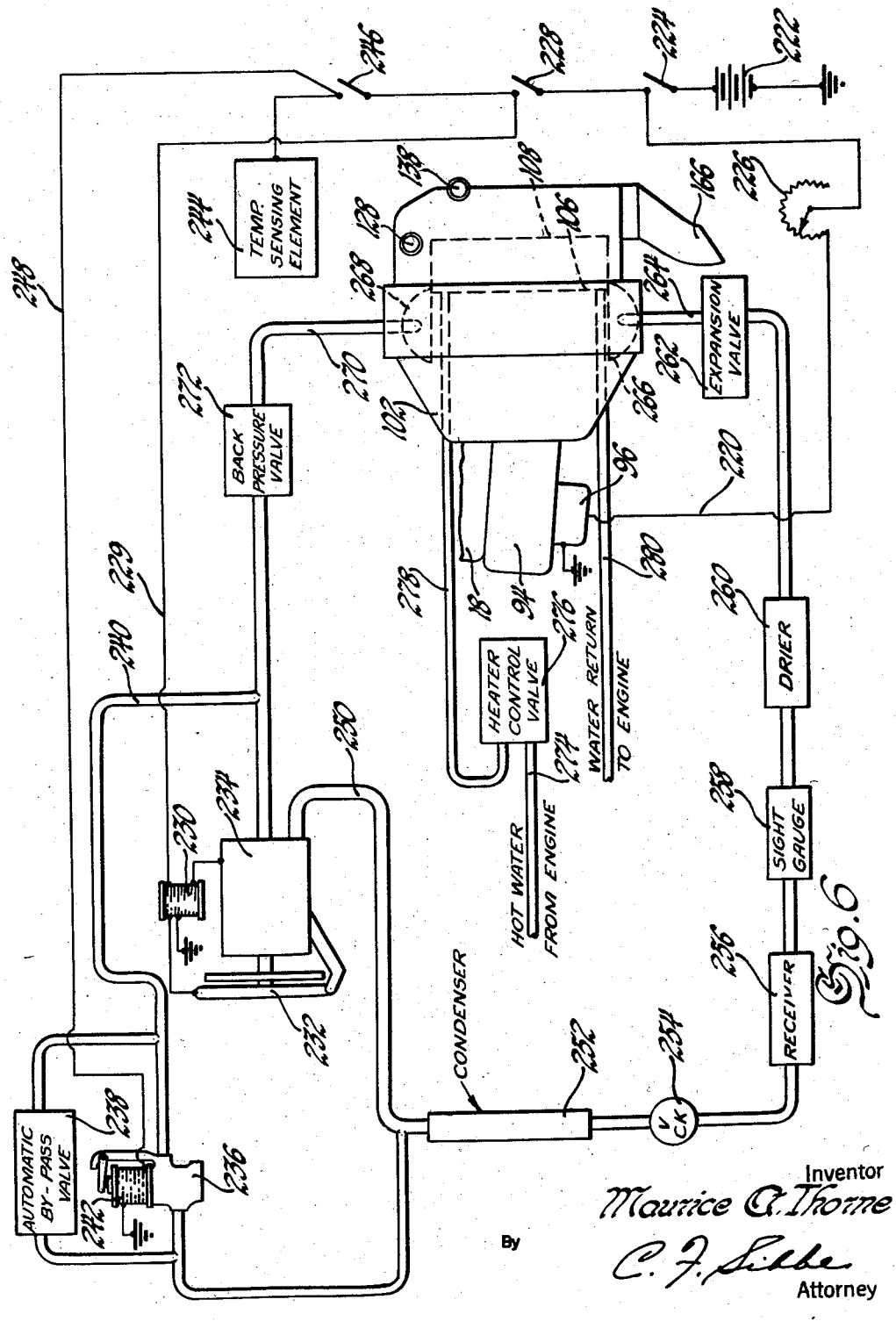

United States Patent Office 2,873,953
Patented Feb. 17, 1959

2,873,953

AIR HEATING AND COOLING APPARATUS FOR VEHICLES

Maurice A. Thorne, Detroit, Mich., assignor to General Motors Corporation, Detroit, Mich., a corporation of Delaware Application December 31, 1954, Serial No. 478,958

1 Claim. (Cl. 257—7)

This invention relates to apparatus for heating or cooling air and more particularly to air conditioning systems for automotive vehicles.

An object of the present invention is to provide a well integrated and improved air conditioning system wherein a single duct is utilized for conducting either heating or cooling air prior to the introduction of such air into the passenger compartment of a car.

Another object of the invention is to provide an improved air conditioning system in which air may be admitted to the car body at the base of the vehicle windshield, cleared of dust and excessive moisture and passed through a single duct to undergo conditioning before being released into the passenger compartment.

A feature of the invention resides in an air conditioning system incorporated in the body of an automotive vehicle and in which two heat exchange cores are mounted in series within a single duct and are located rearwardly of the fire wall of the vehicle.

Another feature of the invention is an air conditioning system for a vehicle body in which a blower and air filtering means are mounted forwardly of the fire wall of the vehicle and a heating core and cooling core for the air are mounted rearwardly of the fire wall.

These and other important features of the invention will now be described in detail in the specification and then pointed out more particularly in the appended claim.

In the drawings:

Fig. 3 is an enlarged view of structure shown in Fig. 1 but drawn to an enlarged scale and more elements being shown in section;

Fig. 4 is a sectional view taken along the line 4—4 of Fig. 1 and drawn to an enlarged scale;

Fig. 5 is an elevational view taken in the direction of the arrows 5—5 in Fig. 3 but drawn to a still larger scale and portions being sectioned more clearly to show the structural arrangement; and Fig. 6 is a schematic representation of the air conditioning system, all showing of the vehicle itself being eliminated.

Figure 1:
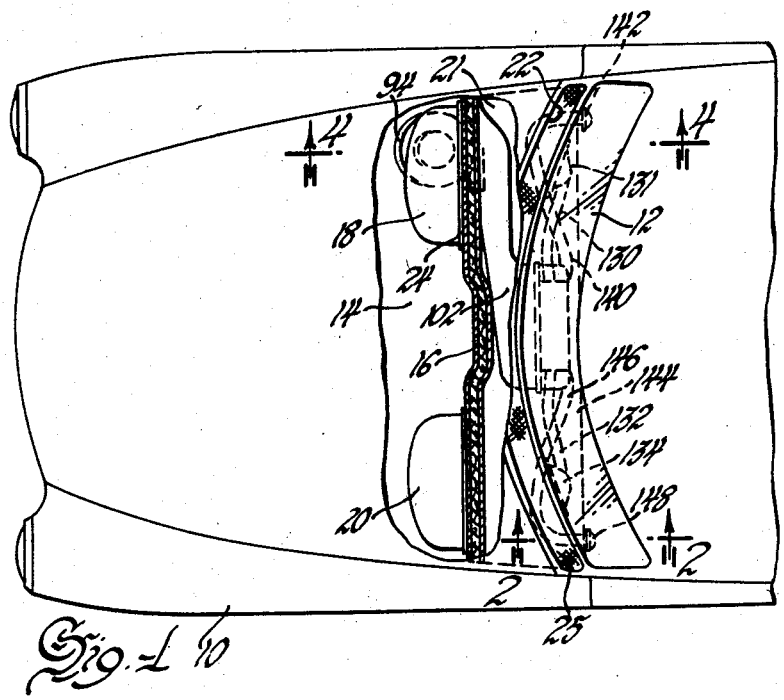
Fig. 1 is a plan view of the forward part of an automotive vehicle, a portion being broken away better to illustrate the invention.

In Fig. 1, an automotive vehicle 10 is depicted having a windshield 12, an engine compartment 14 and a fire wall 16. In the engine compartment 14 and mounted on the fire wall are two blisters 18 and 20 by means of which air may be admitted from the cowl to the passenger compartment 21. Air is first admitted to the body of the vehicle through an elongated slot 22 extending along the base of the windshield. This slot is protected from the entering of foreign matter by an ornamental screen 25. Admission of air to the passenger compartment through the left-hand blister 20 for ventilation purposes may be effectively carried out by an arrangement such as disclosed in the application for United States Letters Patent Serial No. 392,806, filed November 18, 1953, in the names of Leslie, Fox and Muller, and entitled "Vehicle Body With Built-In Ventilation System," now Patent No. 2,807,201.

In the instant invention, the right-hand blister 18 is of novel construction and comprises a flat top 19, a curved wall 23 forming three sides and a flange 24 by means of which the blister is attached to the fire wall 16. The blister is also provided with a bottom wall 26 which has a cylindrical opening 28 surrounded by an annular flange 30 which extends upwardly therefrom. Joined to the upwardly extending edge of the flange 30 is an annular trough member 32 which is adapted snugly to retain one end of a vertically arranged cylindrical air filtering member 34. The latter extends upwardly within the blister 18 and is provided with a removable cover 36 and is spaced from the flat top 19 and the wall 23.

Air entering through the elongated slot 22 at the base of the windshield enters a compartment 38 which extends the full width of the cowl. As intimated heretofore, air from this chamber may be caused to pass through the left-hand blister 20 for ventilation purposes. Insofar as the blister 18 is concerned, however, air from the chamber 38 is caused to enter a port 40 (Fig. 4) formed in a horizontal wall 42 and be directed by a duct 44 through the fire wall 16 and into the blister 18. The forward side of the chamber 38 is defined by an upwardly directed extension 46 of the fire wall 16. The rearward wall of the chamber 38 comprises a curved plate 48 forming a part of the vehicle body structure. The horizontal plate 42 is provided with a rearwardly and downwardly extending portion 50 which is joined by means of a flange 52 to the plate 48. Two rearwardly and upwardly extending baffles 54 and 56 are attached to the portion 50 and by means of which moisture from admitted air may be trapped and prevented from entering the port 40. This trapped moisture is removed from the vehicle by a conduit not shown in the drawings but suitably connected to drain the chamber 38. The duct 44 is also provided with a rearwardly presented wall 45 having an opening 58 which is defined by a forwardly directed flange 60, the edge of which constitutes a valve seat. The opening 40 is defined by a flange 62 and the edge of the latter also constitutes a valve seat. The two valve seats are arranged at right angles for convenient valve action. A shaft 64 is journaled in the walls of the duct 44 and this shaft is rigidly affixed to a V-shaped member 66 to rotate therewith. The two legs 68 and 70 of the member 66 are faced with yieldable pad material 72 and 74, respectively. This pad material is for the purpose of forming a tight seal when engaged with the edge of the flange 62 or 60. Passing through the V-member 66 and the attached pad is a threaded rod 76. Slots are provided in the pad material and the V-member 66 so that the legs 68 and 70 may yieldably move with relation to each other. It will be appreciated that the V-member may be made of spring material so that the legs 68 and 70 are resiliently urged apart. A coil spring 71 is utilized to aid in this respect. Curved face nuts 78 and 80 are threaded upon the opposite ends of the rod 76 and bear against washers 82 and 84, respectively. By this means, the maximum angular distance between the legs 68 and 70 may be adjusted. Fixed to one end of the shaft 64 is a lever 86 which is pivoted at 88 to one end of a Bowden wire 90. This wire is protected by a conduit 92 which is caused to extend to the instrument panel within convenient reach of the operator for conventional push and pull adjustment of the wire 90 to operate the pads 72 and 74 as a unitary valve means.

Attached to the bottom side of the blister 18 and communicating with the opening 28, is a blower 94 which is adapted to be operated by a motor 96. The outlet 98 of the blower is caused to extend through an opening 100 in the fire wall and communicate with a housing 102 attached to the rearward side of the fire wall. This housing has a chamber 104 which extends toward the center of the vehicle and encloses an evaporator core 106 and a heater core 108. The cores are parallel and supported a short distance apart by brackets 107 and 109 (Fig. 5) and a spacer element 111 affixed to a wall portion of the housing. A rearward portion 110 of the housing 102 is fixed to the main part of the housing by means of a flanged structure 112 and suitable fastenings not shown. The housing portion 110 encloses the heating core 108 and also forms a distribution chamber 113.

The upper part of the housing portion 110 is so formed of sheet metal as to constitute an outer curved wall 114, an inner horizontal wall 116 having a port 118 and a forward wall 120 having a port 122 communicating with an upper chamber 124 of the main portion of the housing 102. The upper part of the portion 110 is also provided with horizontal and oppositely directed conduits 126 and 128. The conduit 126 communicates by means of a hose 130 to a conventional windshield defroster outlet 131 located beneath the right-hand side of the windshield 12. The conduit 128 connected to a hose 132 is adapted to lead air to a defroster nozzle 134 at the left-hand side of the windshield. The housing portion 110 is also provided with oppositely directed connections 136 and 138 placed beneath the port 118. The connection 136 communicates by means of a hose 140 to a nozzle 142 located near the right-hand end of the instrument panel 144. Conduit 138 communicates by means of a hose 146 to a similar nozzle 148 arranged near the left end of the instrument panel.

In order to insure even distribution of air to the evaporator core 106 and ultimately to the heating core 108, two curved baffles 150 and 152 are provided within the housing 102, as clearly shown in Fig. 3.

The nozzles 142 and 148 are similar in structure and, therefore, only the nozzle 142 is described herein. It comprises a spherical member (Fig. 2) which is ported at 154 to provide an outlet passage and a finger piece 156 by means of which air projected from the nozzle may be directed in any desired direction within a given angular range. A nozzle of this type and suitable for the purpose is disclosed in the United States Patent 1,559,057, granted October 27, 1925, in the name of A. W. Stewart. The portion 110 of the housing 102 includes a rearward wall 160 having no openings therein and a lower horizontal wall 162 which has an opening 164 leading to a forwardly and downwardly inclined duct 166. This duct has a downwardly and rearwardly inclined opening 168 which preferably is located above the central or transmission housing portion of the vehicle.

Two shafts 170 and 172 are journaled in the walls of the housing portion 110 and are rigidly connected to two valves 174 and 176, respectively, for the control of the ports 118 and 164. Sheet metal pieces 180 and 182 are so joined to the housing portion 110 as to provide a suitable valve seat for the valve 174. A similar arrangement is provided for the valve 176. One end of each of the shafts 170 and 172 is fixed to an arm 190 or 192 and the free ends of these arms are joined by means of links 194 and 196 to a plate 200 which is pivoted at 202 to the housing 102. The plate 200 is so formed as to be roughly triangular in shape and the rods 194 and 196 are pivoted to two corners thereof. The third corner of the plate is pivoted as at 204 to one end of a Bowden wire 206 guided by a conduit 208 and leading to the instrument panel 144. As is conventional, the wire 206 may be pulled or pushed longitudinally by means of a convenient button or other control apparatus within the reach of the operator of the vehicle. The upper end of the rod 194 is provided with a stop nut 207, a fixed washer 209 and a spring 211 arranged between the washer 209 and the connection with the arm 190.

Fig. 6 shows the arrangement of controls suitable to complete an operative system. It is to be understood, as indicated heretofore, that manual control is from the instrument panel 144. The blower motor 96 is operated by a circuit passing through the line 220 leading from the battery 222 and controlled by the manual main switch 224 and rheostat 226 whereby a desired volume flow of air may be secured to suit any condition.

A manual cooling switch 228 is employed to close a circuit through a line 229 leading from the battery 222 and main switch to operate a solenoid 230 which in turn controls a magnetically operated pulley clutch 232. This clutch serves to drive a compressor 234 for a refrigerant such as Freon. The effectiveness of the compressor is determined by the operation of a normally open valve 236 and an automatic by-pass valve 238. These two valves control the passage of Freon through the conduit 240 which by-passes the compressor. A solenoid 242 controls the valve 236 and the circuit through the solenoid is controlled by a temperature sensing element or bulb 244 which advantageously is located in the air outlet hose 140 and which operates a cooling switch 246. A line 248 conducts the required regulating current from the switch 246 to the solenoid 242. The valve 236 is temperature operated as seen from the above whereas the valve 238 is pressure operated.

Refrigerant from the compressor 234 is passed through a conduit 250 to a condenser 252 and then by way of a check valve 254, a receiver 256, a sight gauge 258, a drier 260, and an expansion valve 262 to the cooling core 106. A conduit 264 conducts the cooled refrigerant into the bottom section 266 of the core 106. Refrigerant is discharged from the top section 268 of the cooling core through a conduit 270 and is returned to the compressor by way of a back pressure regulating valve 272.

The supply of heating medium comprises hot water from the engine cooling jacket and it is guided by a conduit 274, a heater control valve 276 and a conduit 278 to the upper section of the core 108. A conduit 280 serves to return the water to the engine.

A more comprehensive description of an equivalent control arrangement for the cooling apparatus is given in the application for United States Letters Patent Serial No. 399,014, filed December 18, 1953, in the names of John R. Holmes, Lawrence A. Zwicker and Robert R. Mandy, and entitled "Air Conditioning System," now Patent No. 2,787,888.

It will be understood that the refrigerant compressor 234 is driven from the car engine through belts and the magnetic clutch 232. The clutch and its controls may be of the general type shown in the co-pending applications Serial Numbers 365,593 filed June 2, 1953, now Patent No. 2,807,344, and 376,606 filed August 26, 1953, now Patent No. 2,747,385.

Figure 2:
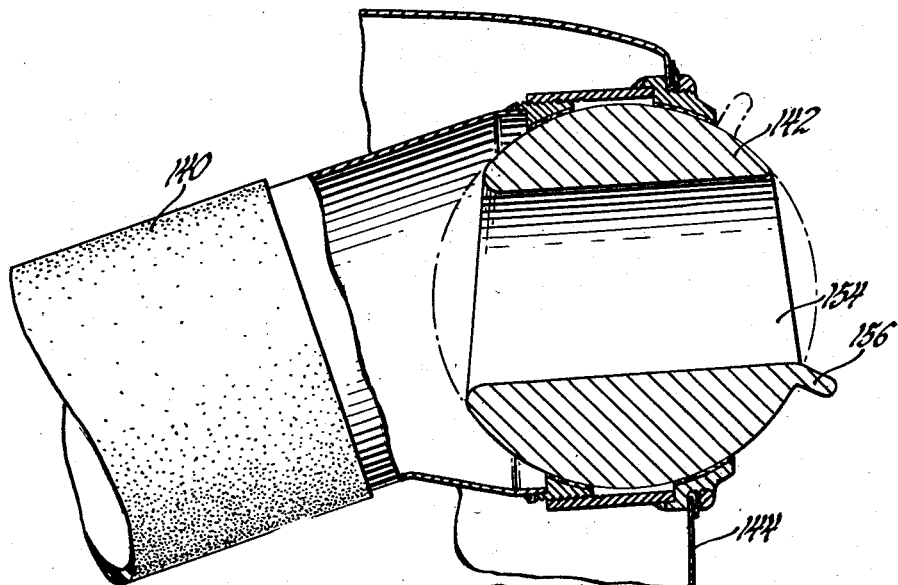
Fig. 2 is an enlarged sectional view of a detail shown in Fig. 1 and taken along the line 2—2 of that figure.

In operation and assuming that the vehicle 10 is moving forward, the ram effect on the air is sufficient to drive air through the elongated opening 22 into the chamber 38 from which it may be utilized as ventilation air and forced through the two blisters 18 and 20 into the car interior or passenger compartment 21. Insofar as the blister 18 is concerned, moisture which may be entrained in the air is removed by the baffles 54 and 56 and dust particles are filtered out by the porous cylindrical filter 34. Air entering the housing 102 may subsequently be admitted to the passenger compartment through the two nozzles 142 and 148 as well as through the defrosters and the downwardly inclined duct 166 dependent upon the actuation of the valves 174 and 176 and the spheres of the nozzles. It will be noted that if the finger piece 156 is placed in its dot-and-dash position as seen in Fig. 2, the port 154 will be closed off. By the overall arrangement provided, a surprisingly large volume of air may be introduced from the exterior of the vehicle into the passenger compartment without any difficulties arising due to entrained moisture or dust. In this situation it is assumed that by manipulation of the wire 90 the valve pad 74 is placed in seating relation with the edge of the flange 60 so that air is free to flow through the port 40 and into the blister 18 surrounding the filter element 34.

In the event that heating of the passenger compartment is desired, the cooler switch 228 is kept open and the main switch 224 is closed. Operation of the rheostat 226 will then result in a desired rate of rotation of the rotor in the blower 94 and, assuming that the heater control valve 276 is properly adjusted, air drawn in by the blower 94 is discharged through both cores 106 and 108 into the distribution chamber 113. As the cooling system involving the compressor 234 and the core 106 is not in operation at this time and the core 108 will be heated, air forced by the blower 94 will be heated by the core 108 and will be introduced into the passenger compartment in accordance with the adjustment of the valves 174 and 176 and nozzles 142 and 148.

If it is desired that the windshield defrosters be operated without the application of heat—i. e.—the usual situation for defogging the windshield 12, then air is passed around the two cores 106 and 108 by causing it to flow through the by-pass chamber 124 and port 122 into defroster hose 130 and 132. This is done by opening a suitable valve 133 controlling the chamber 124 and closing the valves 174 and 176.

Under certain conditions it may be desirable to introduce heated air into the passenger compartment and to recirculate that air by way of the blower 94 and the heat exchange cores. In such an event, the valve pad 72 is caused to engage the edge of the flange defining the port 40 and air from the passenger compartment will enter the port 58 and be recycled through the system and the passenger compartment.

When a refrigerating effect is desired, the switches 224 and 228 are closed and the heater control valve 276 is so operated as to cut off the water supply to the heater core 108. Operation of the compressor 234 will then effectuate a cooling of the core 106 by proper circulation of the refrigerant and air forced by the blower 94 will be cooled by the core 106 prior to introduction into the passenger compartment.

The arrangement, as shown in Fig. 5, is such that operation of the Bowden wire 206 will cause simultaneous opening or closing of the valve 174 or 176 for any given situation.

From the above, it may be seen that a single duct 102 is provided by means of which air may be guided for conditioning by either of the two cores 106 and 108 prior to distribution into the passenger compartment.

The entire system is well integrated and compact and so installed on the vehicle as to present a minimum of interference with other mechanisms and appliances conventionally installed in the cowl zone of motor vehicles.

I claim:

An air heating and cooling system for an automotive body having a windshield, an engine compartment, and a fire wall forward of said windshield with said windshield and fire wall partially defining the forward end of a passenger compartment, inlet duct means incorporated in said body and leading forwardly from an outside air inlet located forward of the base of said windshield for admitting an outside air stream, blister structure in said engine compartment on the forward side of said fire wall, a distributor housing located at the rear of said fire wall and beneath said inlet duct means, an evaporator core and a heater core mounted in said housing in substantially parallel relation with said fire wall, means connected with said housing for discharging air from said cores to said passenger compartment, a blower connected between said blister and said housing and arranged in said engine compartment to effect flow of air from said blister to said cores in series, a valved duct connected with said blister and arranged above said housing in the passenger compartment and having one port communicating with said inlet duct means and a recirculation port communicating with said passenger compartment, unitary valve means disposed in said valved duct between said ports for selectively opening and closing the latter, and baffle means disposed within said inlet duct means for removing entrained moisture from the outside air stream, whereby flow of outside air to said compartment may be effected by ram effect and the function of said blower when said one port is open and air may be recirculated from and through said compartment by said blower when said recirculation port is open.

References Cited in the file of this patent

UNITED STATES PATENTS

| | | |
|---|---|---|
| 2,094,221 | Shaller | Sept. 28, 1937 |
| 2,173,961 | Craft | Sept. 26, 1939 |
| 2,185,486 | Wahlberg | Jan. 2, 1940 |
| 2,197,172 | Aufiero | Apr. 16, 1940 |
| 2,235,642 | Lintern et al. | Mar. 18, 1941 |
| 2,264,848 | Kahl | Dec. 2, 1941 |
| 2,488,278 | Findley | Nov. 15, 1949 |
| 2,647,451 | Aufiero | Aug. 4, 1953 |
| 2,735,657 | Owen | Feb. 21, 1956 |
| 2,789,794 | Moore et al. | Apr. 23, 1957 |